(12) United States Patent
Beheshti et al.

(10) Patent No.: US 12,730,326 B2
(45) Date of Patent: Sep. 8, 2026

(54) FORCE COUNTERBALANCE SYSTEM AND METHOD

(71) Applicant: Apple Inc., Cupertino, CA (US)

(72) Inventors: Matin Seadat Beheshti, Sunnyvale, CA (US); Amin Farzaneh, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 19/078,642

(22) Filed: Mar. 13, 2025

(65) Prior Publication Data

US 2026/0079354 A1 Mar. 19, 2026

Related U.S. Application Data

(60) Provisional application No. 63/696,850, filed on Sep. 19, 2024.

(51) Int. Cl.
*G02B 27/01* (2006.01)

(52) U.S. Cl.
CPC .. *G02B 27/0176* (2013.01); *G02B 2027/0154* (2013.01); *G02B 2027/0163* (2013.01)

(58) Field of Classification Search
CPC ........ G02B 27/0176; G02B 2027/0154; G02B 2027/0163
See application file for complete search history.

(56) References Cited

U.S. PATENT DOCUMENTS

| | | | | |
|---|---|---|---|---|
| 6,351,907 | B1 * | 3/2002 | Otteman | F41G 1/38 42/120 |
| 10,419,745 | B2 * | 9/2019 | Liu | G02B 6/0016 |
| 11,662,594 | B2 * | 5/2023 | Stellman | G02B 27/0172 345/8 |
| 2018/0338130 | A1 * | 11/2018 | Miller | H04N 13/327 |
| 2019/0227329 | A1 * | 7/2019 | Han | G02B 27/0179 |
| 2024/0201505 | A1 * | 6/2024 | Skye | G02B 27/0149 |
| 2025/0237878 | A1 * | 7/2025 | Campbell | G02C 5/045 |

* cited by examiner

*Primary Examiner* — Bryan Earles
(74) *Attorney, Agent, or Firm* — Dorsey & Whitney LLP

(57) ABSTRACT

A counterbalance for an object and a method of counterbalancing a force are disclosed. In an example, a head-mountable device (HMD) includes a housing, an optical module coupled to the housing, and an energy storage device coupled to the optical module. The energy storage device can apply a force to the optical module. A profile of the force can vary non-linearly as a position of the optical module relative to the housing changes.

19 Claims, 9 Drawing Sheets

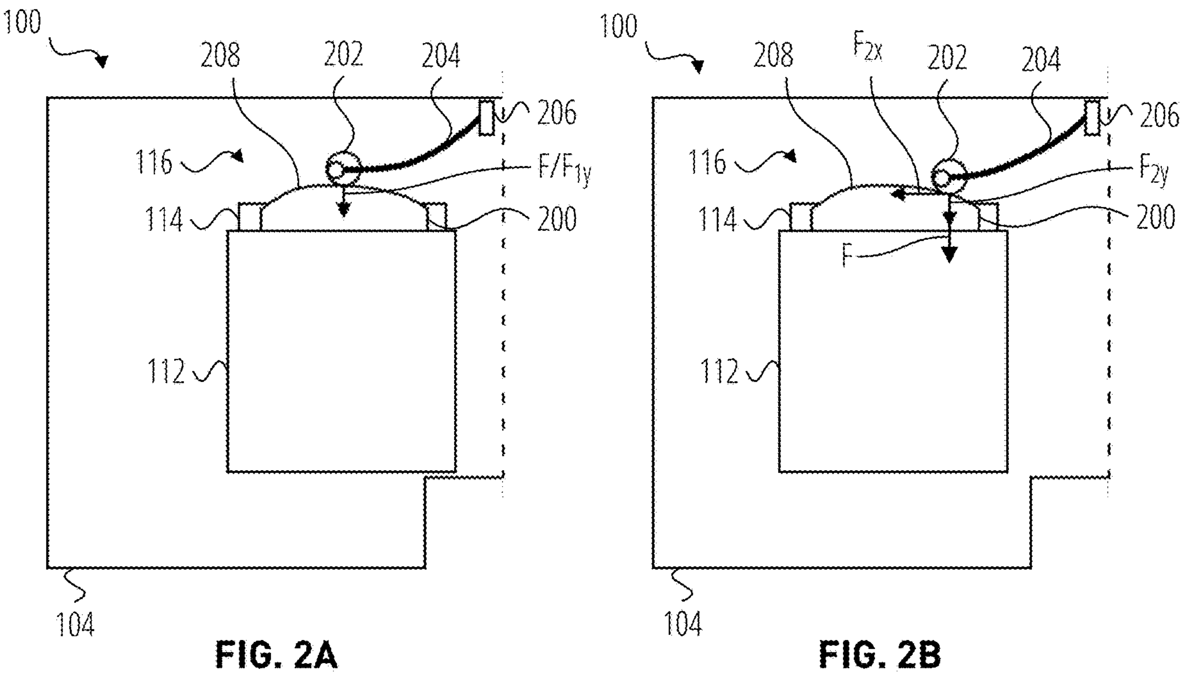
FIG. 2A
FIG. 2B
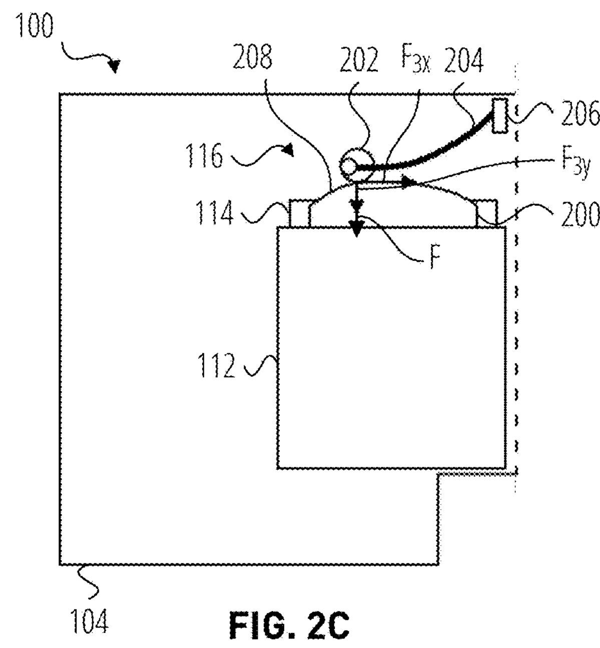
FIG. 2C

FORCE COUNTERBALANCE SYSTEM AND METHOD

CROSS REFERENCE TO RELATED APPLICATIONS

This application claims the benefit of U.S. Provisional Application No. 63/696,850, filed 19 Sep. 2024, entitled "FORCE COUNTERBALANCE SYSTEM AND METHOD," the entire disclosure of which is hereby incorporated by reference.

FIELD

The described examples relate generally to systems and methods for counterbalancing forces. More particularly, the present examples relate to applying forces to an adjustment mechanism for a display of a head-mountable device in order to counterbalance other forces that are applied to the adjustment mechanism, thereby reducing the force utilized to adjust the adjustment mechanism.

BACKGROUND

Recent advances in portable computing have enabled head-mountable devices that provide augmented and virtual reality (AR/VR) experiences to users. Head-mountable devices typically include various components such as a display, a viewing frame, a lens, a battery, a motor, a speaker, and other components. These components can operate together to provide an immersive user experience.

Head-mountable devices can include multiple displays, which can each be aligned with a user's eyes. Users can have different interpupillary distances between their eyes, and the displays can be movable in order for each display to be aligned with the eyes of users having unique interpupillary distances. Providing a mechanism for adjusting the positions of the displays to match a user's interpupillary distance with low force requirements can improve a user's experience with a head-mountable device.

SUMMARY

According to some aspects of the present disclosure, a head-mountable device (HMD) includes a housing, an optical module coupled to the housing, and an energy storage device coupled to the optical module. The energy storage device can apply a force to the optical module. A profile of the force can vary non-linearly as a position of the optical module relative to the housing changes.

In some examples, the HMD can further include a cam coupled to the optical module. The energy storage device can apply the force to the optical module through the cam. The profile of the force can vary according to a surface profile of the cam. In some examples, the surface profile can include a plurality of dimples. In some examples, the energy storage device can include a mechanical spring. In some examples, the energy storage device can be coupled to the surface profile of the cam by a bearing or bushing configured to roll along the surface profile.

In some examples, the energy storage device can include a non-linear energy storage device. In some examples, the HMD can further include a cover coupled to the optical module. The cover can apply a cover force to the optical module. The profile of the force can counterbalance the cover force applied to the optical module by the cover.

According to some examples, an electronic device includes a display, an adjustment mechanism configured to move the display, and a cam coupled to the display and configured to apply an offload force to the display. The offload force can vary based on a surface profile of the cam. The offload force can minimize a force applied by the adjustment mechanism to move the display.

In some examples, the offload force can vary non-linearly as the display moves through a range of motion. In some examples, the offload force can vary dynamically as characteristics of the electronic device change.

In some examples, the electronic device can further include a manual actuator configured to actuate the adjustment mechanism. In some examples, the electronic device can further include a motor configured to actuate the adjustment mechanism.

In some examples, the offload force can be applied to the display through the cam by a passive energy storage device. In some examples, the offload force applied to the display can be configured to vary from a first direction to a second direction opposite the first direction as the display moves in a single direction through a range of motion.

According to some aspects, a method of counterbalancing a force includes determining a profile of a force acting on an object, determining a surface profile for a cam based on the profile of the force, and applying an offload force to the object through the cam. The offload force can vary non-linearly based on the surface profile.

In some examples, the method can further include detecting a change in the profile and altering the offload force based on the change. In some examples, the change can be detected based on environmental conditions of the object or an age of the object. In some examples, altering the offload force can include changing the surface profile of the cam.

In some examples, the surface profile can be determined to minimize a difference between the force and the offload force throughout a travel of the object. In some examples, the profile of the force can be determined by measuring the force as the object moves through a range of motion.

BRIEF DESCRIPTION OF THE DRAWINGS

The present systems and methods should be understood by the following detailed description in conjunction with the accompanying drawings, wherein like reference numerals designate like structural elements, and in which:

FIGS. 2A through 2C are partial front cutaway views of an offload force applied to a display of an HMD.

DETAILED DESCRIPTION

Figure 1A:
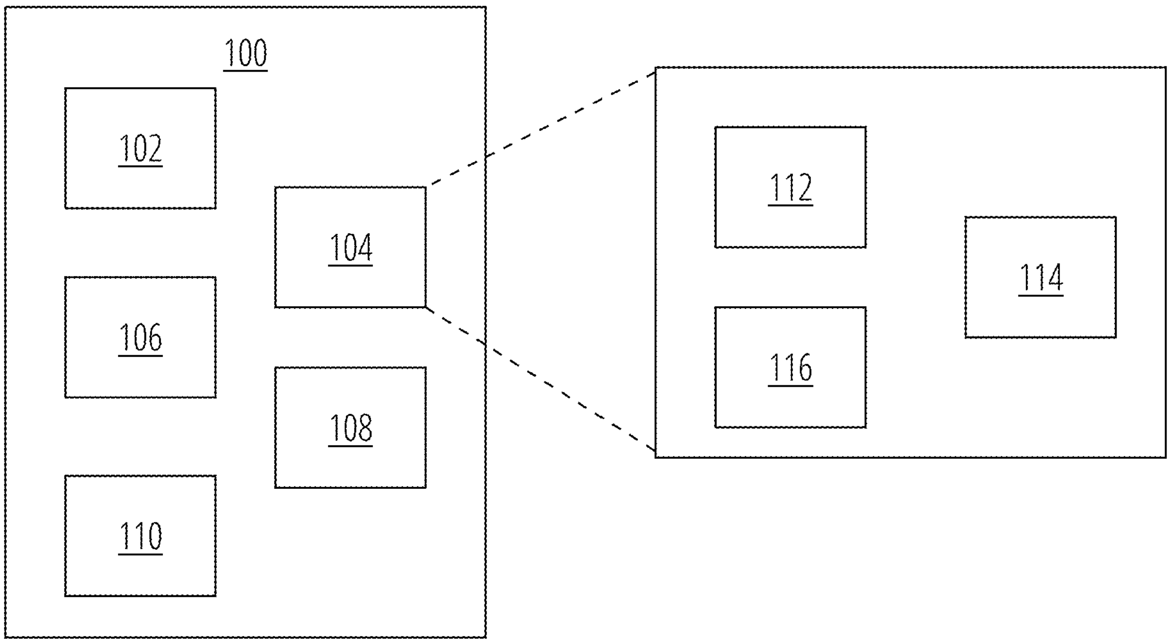
FIG. 1A is a schematic block diagram of a head-mountable device (HMD).

Detailed reference to the embodiments included in the accompanying drawings is provided blow. The descriptions are not intended, and should not be interpreted as, limiting the present systems and methods to a single embodiment. Rather, the description is intended to cover any number of changes, modifications, alternatives and equivalents as can be included within the description and the appended claims.

Head-mountable devices (HMDs) can provide augmented and virtual reality (AR/VR) experiences to users. HMDs can include a variety of components, such as displays, a viewing frame, a lens, a battery, a motor, a speaker, and other components. These components can operate together to provide an immersive user experience. Reducing size, weight, and forces used to operate these components can provide users with an improved and more immersive user experience.

HMDs can include multiple displays, such as one display for each of a user's eyes. Each of the displays can be mounted in an optical module of an HMD. Each of the displays can be aligned with a respective eye of the user. Positions of each of the displays relative to a housing of the HMD and a spacing between the displays (e.g., resulting from an interpupillary distance (IPD) of the user) can be unique to each user of an HMD. An adjustment mechanism can be provided for each of the displays in order to align the respective display to a respective eye of the user.

The HMD can include various components that can apply forces to the displays and/or the adjustment mechanisms. These forces can resist movement of the displays and the adjustment mechanisms. For purposes of this disclosure, these forces will be referred to as intrinsic forces. For example, the HMD can include a cover that can conceal components of the HMD. The cover can be coupled to each of the displays and can apply a force to each respective display that increases a force used by the adjustment mechanism to adjust the position of the display. Larger and more expensive adjustment mechanisms can be used to overcome these intrinsic forces, which can increase the cost of the HMD, increase the weight of the HMD, and reduce user experiences with the HMD.

Various examples disclosed herein relate to counterbalance systems, devices, and methods that can counterbalance intrinsic forces applied to the displays that resist adjustment of the positions of the displays by the adjustment mechanisms. The counterbalances can be tailored to the intrinsic forces present in an HMD such that the force used by each adjustment mechanism to adjust the position of a respective display is minimized. This can reduce force requirements of the adjustment mechanisms to reposition the displays, allow for smaller and cheaper adjustment mechanisms to be used, and improve user experiences with the HMD.

In some examples, the counterbalances can include a cam surface coupled to a respective display, a roller configured to move along the cam surface, and an energy storage device coupled to the roller and configured to apply a force (referred to as a counterbalance force) to the display through the roller and the cam surface. A profile of the cam surface can be tailored to an intrinsic force profile specific to the display. This can allow a minimal force supplied by the adjustment mechanism to adjust the position of the display. Thus, a size and complexity of the adjustment mechanism can be reduced. Customizing the cam surface to intrinsic forces applied to the display can be used to counterbalance the intrinsic forces applied to the display, even when the intrinsic forces applied to the display have a non-linear profile relative to the position of the display. The energy storage device can include a tension spring, a compression spring, a leaf spring, a coiled spring, a torsion spring, a conical spring, an elastomer, a rubber spring, an air spring, magnets, or any other suitable energy storage device. The energy storage device can have a linear or non-linear force profile.

A method for counterbalancing intrinsic forces applied to an object can include determining intrinsic forces applied to the object, determining an offload force (or counterbalance force) for a counterbalance, and applying the offload force to the object. The offload forces applied to the object can be determined by modeling the object, repositioning the object and determining the forces used to reposition the object, or the like. The offload force can be the inverse of the determined intrinsic forces applied to the object. Known or selected properties of an energy storage device (e.g., type of energy storage device, diameters, friction, available space, and the like) can be combined with the offload force profile in order to determine the characteristics of the counterbalance. The counterbalance can then apply the offload force to the object in order to counterbalance the forces applied to the object. As described previously, this can reduce the magnitude of force used to reposition the object.

The counterbalance systems, devices, and methods for counterbalancing adjustment mechanisms of the present disclosure are described in the context of an adjustment mechanism for a position of a display in a head-mountable device relative to a user's eye. However, the counterbalance systems, devices, and methods described herein can be applied in the context of any adjustment mechanisms. For example, the counterbalance systems, devices, and methods described herein can be applied to adjustment mechanisms for other components of an HMD (e.g., a position of a light seal, a band adjustment, or the like) for positions of screens (e.g., monitors, tablet computers, or the like), for automotive applications (e.g., moving doors, enclosures, panels, or the like), for aerospace applications (e.g., moving flaps, flight control surfaces, and the like), for other consumer applications (e.g., moving a garage door or the like), or any other adjustment mechanisms.

These and other examples are discussed below with reference to FIGS. 1A through 7. However, those skilled in the art will readily appreciate that the detailed description given herein with respect to these figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1B:
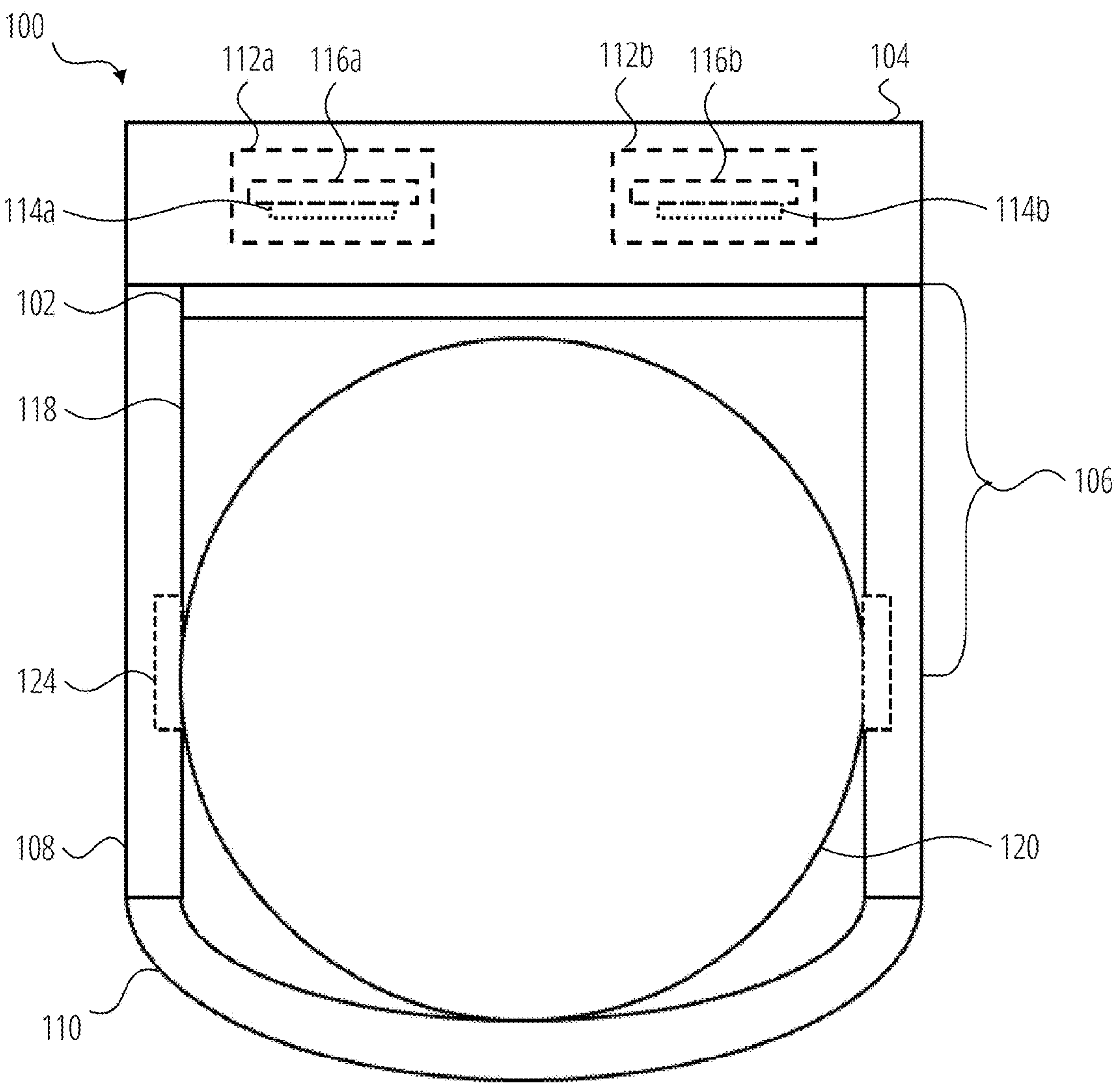
FIG. 1B is a top view of an HMD.
Figure 1C:
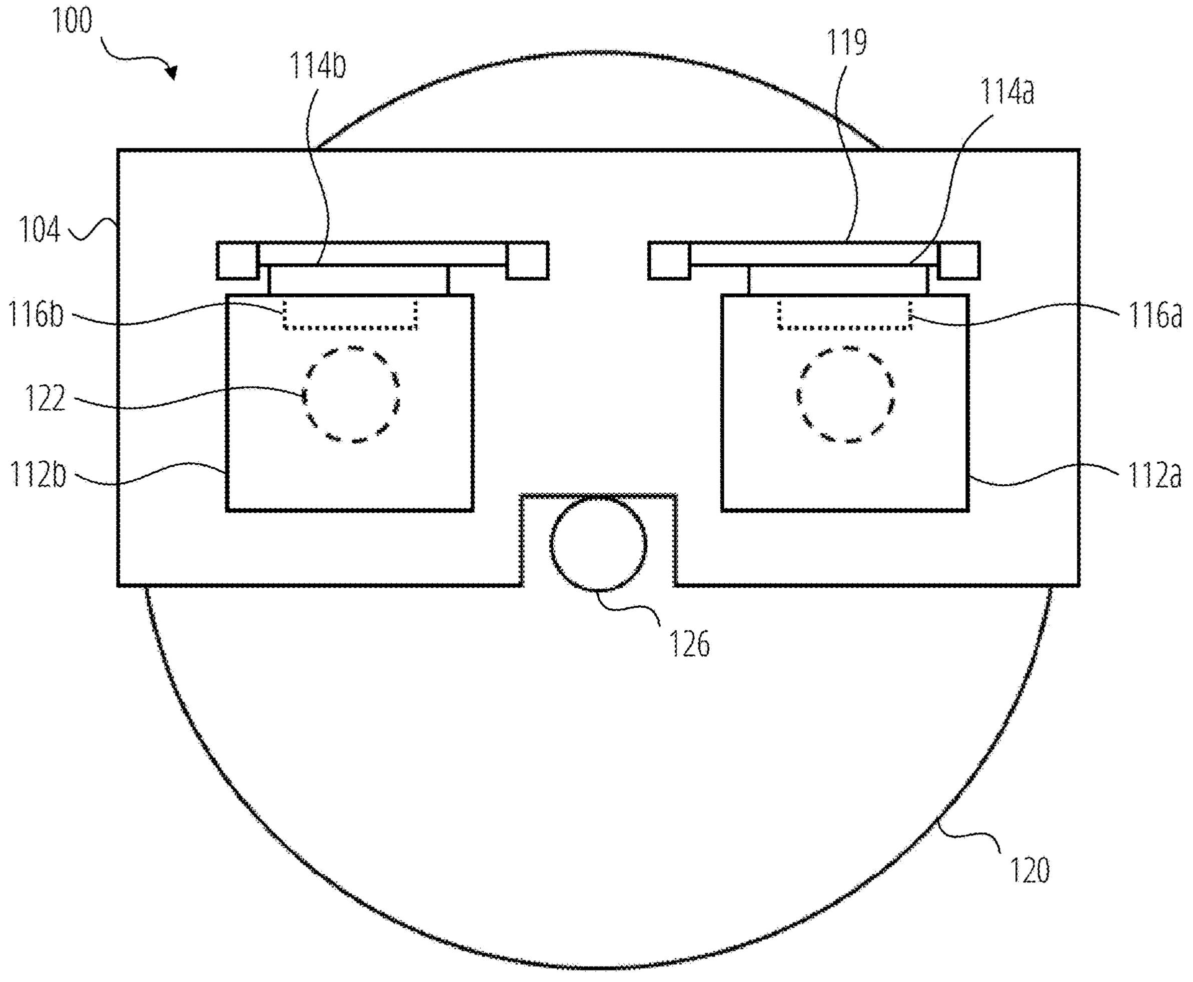
FIG. 1C is a front cutaway view of an HMD.

FIGS. 1A through 1C illustrate a head-mountable device (HMD) 100. FIG. 1A illustrates a block diagram, FIG. 1B illustrates a top-down view, and FIG. 1C illustrates a front-to-back cutaway view of the HMD 100. As illustrated in FIGS. 1A through 1C, the HMD 100 can include a frame 102, a display unit 104, a device seal 106, supports 108, and a band 110. FIGS. 1B and 1C illustrate the HMD 100 donned on a user's head 120.

The display unit 104 can include one or more optical lenses or display screens that are configured to be positioned in front of a user's eyes 122. The display unit 104 can be configured to present an augmented reality visualization, a virtual reality visualization, or another suitable visualization to the user. The display unit 104 can be positioned at least partially in or on the frame 102. The frame 102 can be a housing of the display unit 104. The device seal 106 can be physically coupled to the frame 102. In some examples, the device seal 106 includes the frame 102 (e.g., the frame 102 can be part of the device seal 106). The frame 102, the display unit 104, and the device seal 106 can collectively form a display housing.

The device seal 106 can include a facial interface frame (not separately illustrated), a cover 118, and electrical components (e.g., sensors, actuators, or the like). In some examples, the device seal 106 can refer to a portion of the HMD 100 that engages or shields the user's face. The device seal 106 can include portions of the HMD 100 that conform to, contact, or press against regions of the user's face (e.g., the facial interface frame). The cover 118 of the device seal 106 can be used to hide or conceal components of the HMD 100. The cover 118 can be used to shield the user's face (e.g., the user's eyes 122) from an external environment (e.g., from light emanating from outside the HMD 100). The device seal 106 can also be referred to as a light seal.

The supports 108 and/or the band 110 can retain the HMD 100 relative to the user's head 120. The supports 108 can be connected to the display unit 104 and can extend distally toward a rear of the user's head 120. In some examples, the supports 108 can be extensions of the display housing, such as the display unit 104. The supports 108 can be coupled to left and right sides of the display unit 104 to physically and/or electrically couple the supports 108 to the display unit 104. The supports 108 can be formed from rigid materials, such as rigid polymers and/or other materials. The supports 108 can contain sensors, buttons, speakers, and/or other electrical components. Hinges and/or other mechanisms can be used to couple the supports 108 to the display unit 104. In some examples, the supports 108 can be formed integrally as portions of the display unit 104.

The supports 108 and/or the band 110 can be configured to secure the display unit 104 in a position relative to the user's head 120 (e.g., such that the display unit 104 is maintained in front of the user's eyes 122). In the example illustrated in FIG. 1B, the supports 108 can extend over a user's ears 124. In some examples, the supports 108 can rest on the user's ears 124 to secure the HMD 100 via friction between the supports 108 and the user's head 120. In some examples, the adjustable band 110 can extend over or around the user's ears 124 and can apply pressure to any combination of the front, the back, and/or the sides of the user's head 120 and/or the user's ears 124. As illustrated in FIG. 1C, the display unit 104 can extend over a user's nose 126. In some examples, the display unit 104 can rest on the user's nose 126 to secure the HMD 100 via friction between the display unit 104 and the user's head 120.

The display unit 104 can include a first display **112*a* and a second display 112*b* (collectively referred to as displays 112), a first adjustment mechanism 114*a* and a second adjustment mechanism 114*b* (collectively referred to as adjustment mechanisms 114), and a first counterbalance 116*a* and a second counterbalance 116*b* (collectively referred to as counterbalances 116). The displays 112 can include one or more optical lenses or display screens that are configured to be positioned in front of the user's eyes 122. As illustrated in FIG. 1B and FIG. 1C, the displays 112 can include the first display 112*a* and the second display 112*b*, each of which is positioned in front of a respective one of the user's eyes 122. The displays 112 can be configured to present an augmented reality visualization, a virtual reality visualization, or another suitable visualization to the user. The displays 112 can be positioned at least partially in or on the frame 102. The frame 102 can be a housing of the display unit 104**.

The first adjustment mechanism **114*a* and the second adjustment mechanism 114*b* can be provided for the first display 112*a* and the second display 112*b*, respectively, and can be used to adjust positions of the first display 112*a* and the second display 112*b* relative to the user's eyes 122. Specifically, the adjustment mechanisms 114 can be used to align each of the displays 112 with a respective one of the user's eyes 122 and can adjust a distance between the displays 112. The distance between the displays 112 can be based on an interpupillary distance (IPD) of the user. The adjustment mechanisms 114 can be actuated by motors, manually by a user of the HMD 100 (e.g., through a dial, a slider, a button, a lever, combinations thereof, or the like), or the like. As illustrated in FIG. 1C, the adjustment mechanisms 114 can be coupled to guide rails 119, which can be part of or coupled to the frame 102. The guide rails 119 can direct movement of the displays 112 relative to the frame 102. For example, the guide rails 119 can allow the displays 112 to move in an x-direction illustrated in FIGS. 1B and 1C. The displays 112 can be components of optical modules, which can be repositioned by the adjustment mechanisms 114. In other words, the displays 112 or optical modules of the HMD 100 including the displays 112 can be repositioned by the adjustment mechanisms 114**.

Components of the HMD 100 can apply forces to the displays 112. These forces can encourage movement of the displays 112 relative to the frame 102, resist movement of the displays 112 actuated by the adjustment mechanisms 114, and the like. These forces present at the displays display 112 can be referred to as intrinsic forces. As an example of an intrinsic force applied to the displays 112, the cover 118 can be formed from an elastic material and can be coupled to the displays 112. The cover 118 can apply a non-linear force to the displays 112, which can resist movement of the displays 112 actuated by the adjustment mechanisms 114. The intrinsic forces applied to the displays 112 by the cover 118 can have different profiles and magnitudes depending on a direction, magnitude, and speed of repositioning of the displays 112 actuated by the adjustment mechanisms 114. The cover 118 is one example of a component of the HMD 100 that can apply intrinsic forces and resistance to the displays 112. However, other components of the HMD 100 can also apply intrinsic forces (or resistive forces) to the displays 112. Components of the HMD 100 can also apply intrinsic forces and resistance to the adjustment mechanisms 114 themselves. In order to overcome the intrinsic forces acting on the displays 112, larger motors and greater forces can be used to actuate the adjustment mechanisms 114. This can increase the cost and size of components of the HMD 100, can reduce user comfort while using the HMD 100, and can reduce user experiences with the HMD 100. Thus, it can be desirable to compensate for the intrinsic forces that resist movement of the displays 112.

In order to counteract intrinsic forces applied to the displays 112 that resist movement of the displays 112 or encourage undesired movement of the displays 112, the first counterbalance **116*a* and the second counterbalance 116*b* can be provided. The first counterbalance 116*a* can be provided for the first display 112*a* (and the first adjustment mechanism 114*a*) and the second counterbalance 116*b* can be provided for the second display 112*b* (and the second adjustment mechanism 114*b*). As will be discussed in greater detail below, the counterbalances 116 can be used to apply counterbalance forces to the displays 112 that are tailored to the specific intrinsic forces that are present at or applied to each of the displays 112 and can counteract or counterbalance those specific intrinsic forces. In other words, the counterbalance forces applied to the displays 112 by the counterbalances 116 can have profiles (e.g., non-linear profiles) that mirror intrinsic force profiles applied to the displays 112. This can result in a minimal net force being applied to the displays 112 and can minimize forces used to actuate the adjustment mechanisms 114 in order to reposition the displays 112. In examples in which the adjustment mechanisms 114 are actuated by motors, this can allow for cheaper, smaller motors to be used to actuate the adjustment mechanisms 114. In examples in which the adjustment mechanisms 114 are manually actuated, this can allow for the user to actuate the adjustment mechanisms 114 with smaller forces. In both cases, this can reduce the size and cost of components of the HMD 100, reduce forces present in the HMD 100, improve user comfort while using the HMD 100, and improve user experiences with the HMD 100**.

FIGS. 2A through 2C illustrate front-to-back cutaway views of a portion of an HMD 100. Specifically, FIGS. 2A through 2C illustrate counterbalance forces applied by a counterbalance 116 to a display 112 when the display 112 is in different relative positions within the HMD 100 (e.g., in different positions relative to a display unit 104, a frame 102, and other components of the HMD 100). The counterbalance forces applied by the counterbalance 116 can be used to counter, offset, or offload other intrinsic forces that are applied to the display 112 (e.g., intrinsic forces that resist movement or encourage undesired movement of the display 112). This can minimize forces used to actuate an adjustment mechanism 114 in order to move or reposition the display 112.

The counterbalance 116 can include a cam 200, a roller 202, and an energy storage device 204. The cam 200 can be coupled to the display 112 and the counterbalance 116 can apply a force to the display 112 through the cam 200. The energy storage device 204 can be coupled to the cam 200 through the roller 202 and can apply a force to the cam 200 through the roller 202. The energy storage device 204 can be fixed to the HMD 100 through an anchor 206. For example, the anchor 206 can be fixed to a stationary component of the HMD 100, such as the frame 102, the display unit 104, or the like.

The cam 200 can include a cam surface 208. A surface profile of the cam surface 208 can be configured to adjust a magnitude of a force applied by the energy storage device 204 to the cam 200 based on a position of the display 112. For example, in the configuration of FIGS. 2A through 2C, the energy storage device 204 can apply a force F to the roller 202 in a vertically downward direction. Depending on a portion of the cam surface 208 that the roller 202 contacts, this force F can be converted to a force applied to the cam 200 that includes vertical and horizontal components. The horizontal components can be used to offset intrinsic forces applied to the display 112. As illustrated in FIG. 2A, when the display 112 is in a relatively central position, the roller 202 contacts a flat surface of the cam surface 208. The force F is applied to the cam 200 as a vertical force Fly that only includes a vertical component.

As illustrated in FIG. 2B, when the display 112 is in a relatively leftward position, the roller 202 contacts a sloped surface of the cam surface 208. The force F is applied to the cam 200 as a vertical force $F_{2y}$ and a horizontal force $F_{2x}$. The horizontal force $F_{2x}$ is a horizontal component that pushes the display 112 leftwards and can help to counter intrinsic forces applied to the display 112. For example, a cover (e.g., the cover 118) of the HMD 100 can be coupled to the display 112 and can exert an intrinsic force on the display 112 that pushes the display 112 from the position in FIG. 2B towards the position in FIG. 2A. The horizontal force $F_{2x}$ can counter the intrinsic force on the display 112 from the cover such that a minimal or 0 N effective force is applied to the display 112. As a result, a minimal force can be applied through the adjustment mechanism 114 in order to move the display 112 relative to the HMD 100.

As illustrated in FIG. 2C, when the display 112 is in a relatively rightward position, the roller 202 contacts a sloped surface of the cam surface 208. The force F is applied to the cam 200 as a vertical force $F_{3y}$ and a horizontal force $F_{3x}$. The horizontal force $F_{3x}$ is a horizontal component that pushes the display 112 rightwards and can help to counter other intrinsic forces applied to the display 112. For example, a cover (e.g., the cover 118) of the HMD 100 can be coupled to the display 112 and can exert an intrinsic force on the display 112 that pushes the display 112 from the position in FIG. 2C towards the position in FIG. 2A. The horizontal force $F_{3x}$ can counter the intrinsic force on the display 112 from the cover such that a minimal or 0 N effective force is applied to the display 112. As a result, a minimal force can be applied through the adjustment mechanism 114 in order to move the display 112 relative to the HMD 100.

The surface profile of the cam surface 208 can be configured to adjust a magnitude of a force F applied by the energy storage device 204 to the cam 200 based on the position of the display 112. For example, surfaces of the cam surface 208 with that are generally perpendicular (e.g., as in FIG. 2A) to the force F applied by the energy storage device 204 can result in an effective force applied to the display 112 through the cam 200 being substantially vertical. Because movement of the display 112 can be limited to a horizontal direction (e.g., by guide rails 119 or the like), this can have a minimal impact on the force applied through the adjustment mechanism 114 to move the display 112. Angling the surfaces of the cam surface 208 relative to the force F applied by the energy storage device 204 (e.g., as in FIGS. 2B and 2C) can increase a horizontal component of force applied to the display 112 through the cam 200. Based on this relationship, the surface profile of the cam surface 208 can be tailored to intrinsic forces that act on the display 112 throughout travel of the display 112. In other words, the surface profile of the cam surface 208 can be adjusted to optimize the force profile applied to the display 112 by the counterbalance 116 based on intrinsic forces that act on the display 112. The travel of the display 112 can refer to a range of motion through which the display 112 is configured to travel between two end points. The surface profile of the cam surface 208 illustrated in FIGS. 2A through 2C can be designed to counterbalance non-linear intrinsic forces applied to the display 112; however, different surface profiles can be provided to counterbalance linear or non-linear intrinsic forces applied to the display 112. The surface profile of the cam surface 208 can be customized to any intrinsic force profiles applied to the display 112.

In the example of FIGS. 2A through 2C, the counterbalance 116 can apply counterbalance forces to the display 112 in different directions depending on whether the display 112 is positioned leftward (FIG. 2B) or rightward (FIG. 2C) of a central position (FIG. 2A). Depending on the intrinsic forces present at the display 112 in various positions, the counterbalance 116 can apply counterbalance forces to the display 112 that are in the same direction across travel of the display 112, counterbalance forces that change direction multiple times during across travel of the display 112, or the like. Further, the magnitude of the counterbalance forces applied to the display 112 by the counterbalance 116 can vary across travel of the display 112 in any desired manner. Thus, the counterbalance forces applied to the display 112 by the counterbalance 116 can be infinitely customizable and can be tuned or optimized to any intrinsic force profiles present at the display 112 throughout the travel of the display 112.

In some examples, the surface profile of the cam surface 208 can be dynamic. For example, the cam surface 208 can include several tracks, can be angled in multiple directions, or can be flexible. A motor or other electrical actuator can be coupled to the cam surface 208 or another component of the counterbalance 116 (e.g., the roller 202, the energy storage device 204, or the like), and can move or alter the cam surface 208 (e.g., a surface profile of the cam surface 208) or can move or alter a path of the roller 202 relative to the cam surface 208. Intrinsic forces that act on the display 112 can change based on environmental conditions, based on wear and tear on the HMD 100, or the like. Providing a dynamic cam surface 208 can tailor counterbalance forces applied through the cam 200, even as the HMD 100 is used in diverse environments, throughout a lifecycle of the HMD 100, and the like. Further, in examples in which the cam surface 208 is static, rather than dynamic, the surface profile of the cam surface 208 can be customized or tuned to intrinsic forces applied to the display 112 at any point during the life cycle of the HMD 100 or at any baseline environmental state. For example, the surface profile of the cam surface 208 can be customized or tuned to intrinsic forces applied to the display 112 when the HMD 100 is at an average temperature and components of the HMD 100 are at a half-life wear-and-tear condition. Wear-and-tear of the HMD 100 can be estimated based on an age of the HMD 100.

The energy storage device 204 can be a passive or active energy storage device. Passive energy storage devices can include springs (e.g., metal springs, mechanical springs, tension springs, compression springs, leaf springs, coiled springs, torsion springs, conical springs, elastomer springs, rubber springs, air springs, or the like), magnets, or any other suitable passive energy storage devices. The energy storage device 204 can be an active energy storage device, or a passive energy storage device can be combined with an active component. For example, a motor or other electrical actuator can be combined with a passive energy storage device and can be used to change characteristics of the passive energy storage device, such as a stiffness, application angle (e.g., a direction of the force F), or the like. The energy storage device 204 can apply a linear or non-linear force to the roller 202. Characteristics of the energy storage device 204 can be tailored along with the cam surface 208 in order to provide counterbalance forces to the display 112 that offload or counterbalance intrinsic forces that act on the display 112. For example, characteristics of the energy storage device 204 that can impact counterbalance forces applied to the display 112 through the cam 200 can include materials, a stiffness, a preload, a maximum deflection, a spring constant, a magnetic field strength, a geometry, a thickness, and the like. Thus, various characteristics of the energy storage device 204 can be adjusted to optimize the counterbalance force profile applied to the display 112 by the counterbalance 116 based on intrinsic forces that act on the display 112.

The roller 202 can be a circular or round component, which can roll along the cam surface 208. In some examples, the roller 202 can be or include a bearing, a bushing, or the like. The energy storage device 204 can be coupled to the roller 202 through a central axis of the roller 202. In some examples, a surface profile of the roller 202 can be tailored to intrinsic forces that act on the display 112 throughout travel of the display 112 (e.g., in addition to or in place of tailoring the surface profile of the cam surface 208). In some examples, the roller 202 can be a cam, and the cam 200 can be a flat or planar surface or can be omitted and the roller 202 can roll along a surface of the display 112. A diameter of the roller 202 can determine a contact angle of the roller 202 with the cam surface 208, and this diameter can be used to tailor the counterbalance forces applied to the display 112 by the cam 200 to intrinsic forces applied to the display 112. Further, grease applied to the roller 202 and friction between the roller 202 and the cam surface 208 can impact counterbalance forces applied through the counterbalance 116 as well as a tactile experience when moving the display 112 (e.g., through manual actuation of the adjustment mechanism 114). Thus, various characteristics of the roller 202 can be adjusted to optimize the counterbalance force profile applied to the display 112 by the counterbalance 116 based on intrinsic forces that act on the display 112.

Positions of the components of the counterbalance 116 relative to components of the HMD 100 can be modified as desired to provide a compact or otherwise desired configuration in the HMD 100. For example, the cam 200 can be coupled to the display 112 or the adjustment mechanism 114 and the anchor 206 can be coupled to the frame 102, the display unit 104, or another component of the HMD 100 that the display 112 can move relative to. In some examples, positions of the cam 200 and the anchor 206 can be flipped. For example, the anchor 206 can be coupled to the display 112 or the adjustment mechanism 114 and the cam 200 can be coupled to the frame 102, the display unit 104, or another component of the HMD 100 that the display 112 can move relative to.

Figure 3:
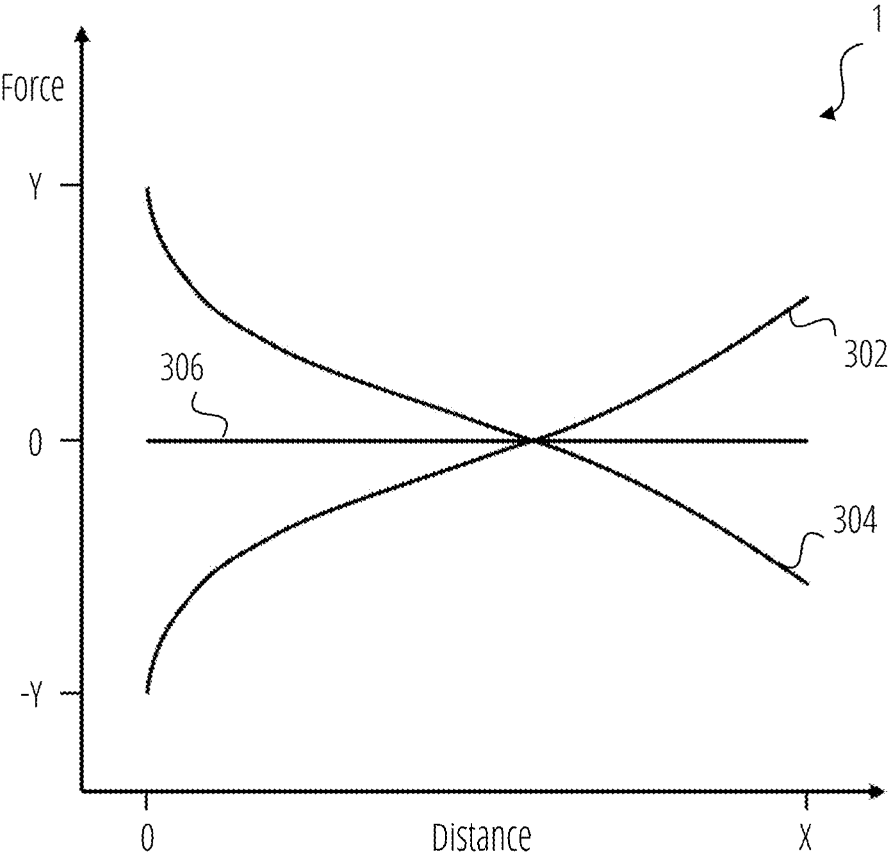
FIG. 3 is a graphical representation of forces applied to an object vs position of the object.

FIG. 3 illustrates a graphical representation of forces applied to an object (e.g., a display, such as the display 112) vs. position of the object. The force profiles of FIG. 3 can be used to determine a surface profile of a cam surface (e.g., the cam surface 208) for a cam (e.g., the cam 200). The y-axis of the graph 1 of FIG. 3 represents forces applied to the object and the x-axis of the graph 1 of FIG. 3 represents a position of the object. Line 302 represents intrinsic forces applied to the object that impact movement of the object. For example, in the example of the HMD 100, line 302 can represent forces applied to the display 112 by components of the HMD 100, such as the cover 118. Line 304 represents counterbalance forces applied to the object by a counterbalance. For example, in the example of the HMD 100, the line 304 can represent forces applied to the display 112 by the counterbalance 116. As illustrated in FIG. 3, the line 304 can be designed or optimized to mirror the line 302. Line 306 represents the total of forces applied to the object, which includes the sum of lines 302, 304.

As illustrated in FIG. 3, the line 306 can be a flat line at 0 force (e.g., about 0 N or the like). By optimizing the force applied by the counterbalance 116 (e.g., the line 304) based on the intrinsic forces applied to an object (e.g., the line 302), the line 306 or the total forces applied to the object can be minimized. As a result, a minimal effective force or an effective force of about 0 N is present at the object as the object is in any position along travel of the object between endpoints (represented as 0 and X in FIG. 3). This minimizes the force that is used to move the object (e.g., by the adjustment mechanism 114). As such, a motor used to move the object, or a manual force provided to move the object can be minimized. This can reduce the size and cost of components used to move the object, improve the ease of moving the object, and the like.

In FIG. 3, the line 302 represents a non-linear intrinsic force profile applied to the object. The line 304 represents a non-linear counterbalance force profile applied to the object to counter or offload the non-linear intrinsic force profile of the line 302. The surface profile of a cam surface of a cam and characteristics of an energy storage device can be adjusted or tuned to offload or counter any intrinsic force profiles, including linear and non-linear intrinsic force profiles. As a result, the effective force applied to the object can be minimized across travel of the object, and a minimal force can be used to move the object throughout the travel of the object.

Figure 4:
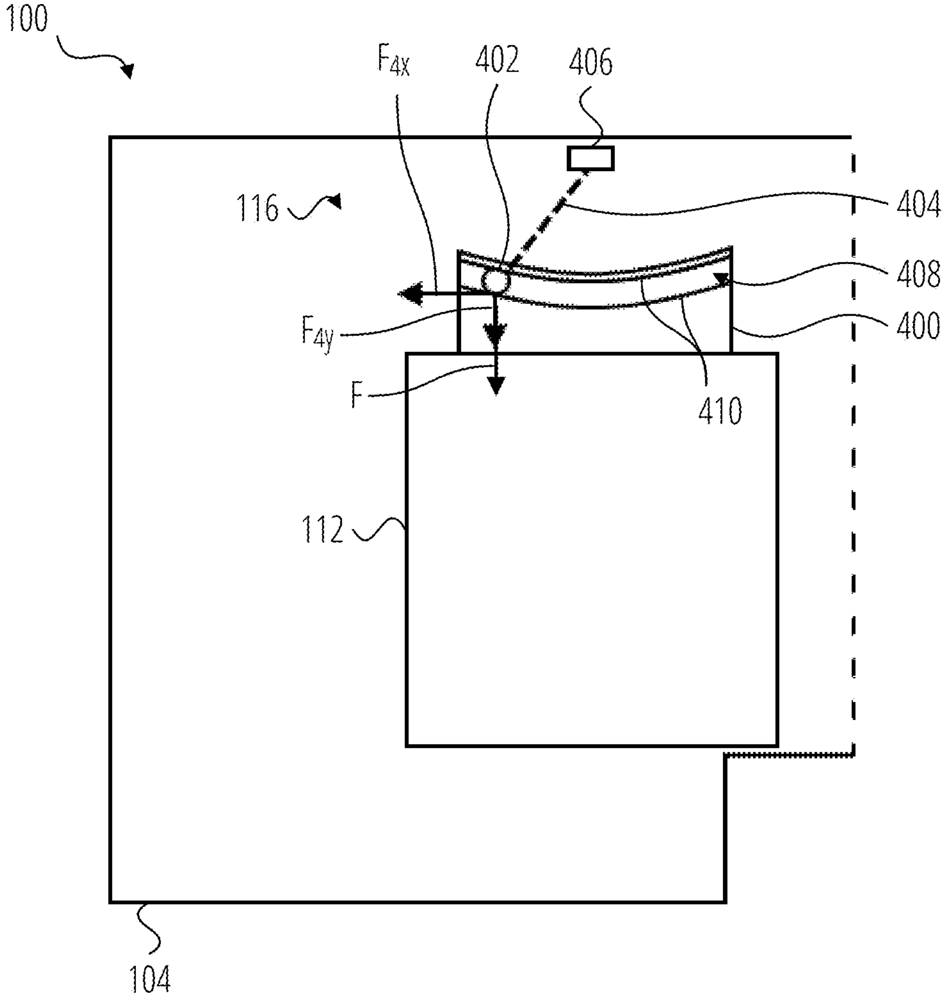
FIG. 4 is a partial front cutaway view of an offload force applied to display of an HMD.

FIG. 4 illustrates a front-to-back cutaway view of a portion of an HMD 100. In FIG. 4, a counterbalance 116 is used to apply a counterbalance force to a display 112. The counterbalance force applied by the counterbalance 116 can be used to counter, offset, or offload intrinsic forces that are applied to the display 112 (e.g., intrinsic forces that resist movement or encourage undesired movement of the display 112). This can minimize forces used to actuate an adjustment mechanism 114 in order to move or reposition the display 112.

The counterbalance 116 can include a cam 400, a roller 402, and an energy storage device 404. Each of the components of the counterbalance 116 can be the same as or similar to components of the counterbalance 116 described above in reference to FIGS. 2A-2C. The cam 400 can be coupled to the display 112 and the counterbalance 116 can apply a force to the display 112 through the cam 400. The energy storage device 404 can be coupled to the cam 400 through the roller 402 and can apply a force to the cam 400 through the roller 402. The energy storage device 404 can be fixed to the HMD 100 through an anchor 406. For example, the anchor 406 can be fixed to a stationary component of the HMD 100, such as the frame 102, the display unit 104, or the like.

The cam 400 can include a channel 408 defined between surfaces 410. The channel 408 can define a path for the roller 402 to move along, and the path can be defined by the surfaces 410. A profile of the path defined by the channel 408 can be configured to adjust a magnitude of a force applied by the energy storage device 404 to the cam 400 based on a position of the display 112. For example, the energy storage device 404 can apply a force F to the roller 402 in a vertically downward direction. Depending on a portion of the surfaces 410 that the roller 402 contacts, this force F can be converted to a force applied to the cam 400 that includes vertical component $F_{4y}$ and a horizontal component $F_{4x}$. The horizontal component $F_{4x}$ can be used to offset intrinsic forces applied to the display 112.

In the example of FIG. 4, the roller 402 is between the surfaces 410. This allows for the energy storage device 404 to apply counterbalance forces to the cam 400 through either tensile or compressive forces. Further, the lower surface 410 of the cam 400 has a concave profile, rather than the convex profile illustrated in FIGS. 2A-2C. The upper surface 410 of the cam 400 has a convex profile. Depending on whether compressive or tensile forces are applied by the energy storage device 404 and a profile of intrinsic forces applied to the display 112, any combination of convex and concave profiles can be applied to the surfaces 410. In some examples, both tensile and compressive forces can be applied by the energy storage device 404 as the display 112 moves throughout its travel. As a result, the counterbalance 116 can counterbalance any intrinsic forces applied to the display 112 as the display 112 is moved through its travel relative to the HMD 100.

Figure 5:
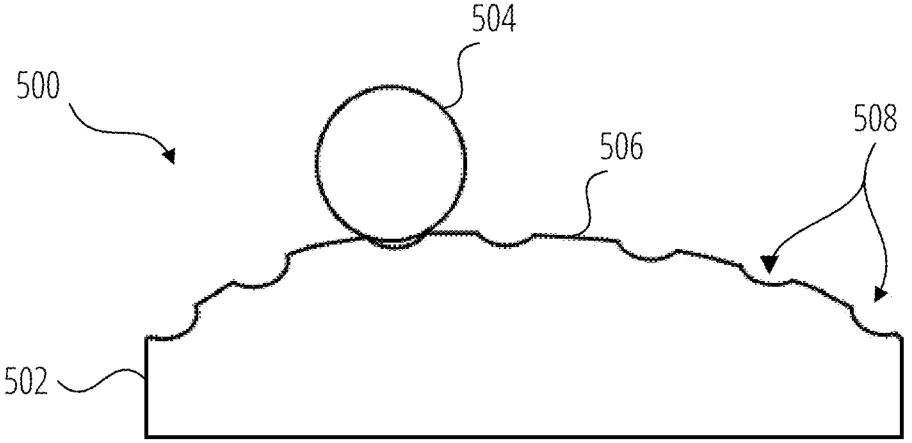
FIG. 5 is a front view of a cam including a dimpled cam surface.

FIG. 5 illustrates a front view of a cam system 500 that includes a cam 502 with a dimpled cam surface 506. A roller 504 can be provided to roll along the cam surface 506, and a counterbalance force can be applied to the cam 502 by an energy storage device through the roller 504. The cam surface 506 can include dimples 508, which can alternatively be referred to as recesses, divots, or the like. The dimples 508 can act as detents to retain the cam 502 and a display to which the cam 502 is coupled in specific positions along a travel of the display. In examples in which an adjustment mechanism of an HMD is manually actuated, the dimples 508 can provide a user of the HMD with tactile feedback as the position of the display is moved along the travel of the display. Grease can be applied between the roller 504 and the cam surface 506, and this can customize or tune the detent force and/or the tactile feedback provided by the dimples 508. Further, the depth of each of the dimples 508 can be varied to customize or tune the detent force and/or the tactile feedback provided by the dimples 508. The cam system 500 and the dimples 508 can be used with any of the counterbalances 116 described in the present disclosure.

Figure 6:
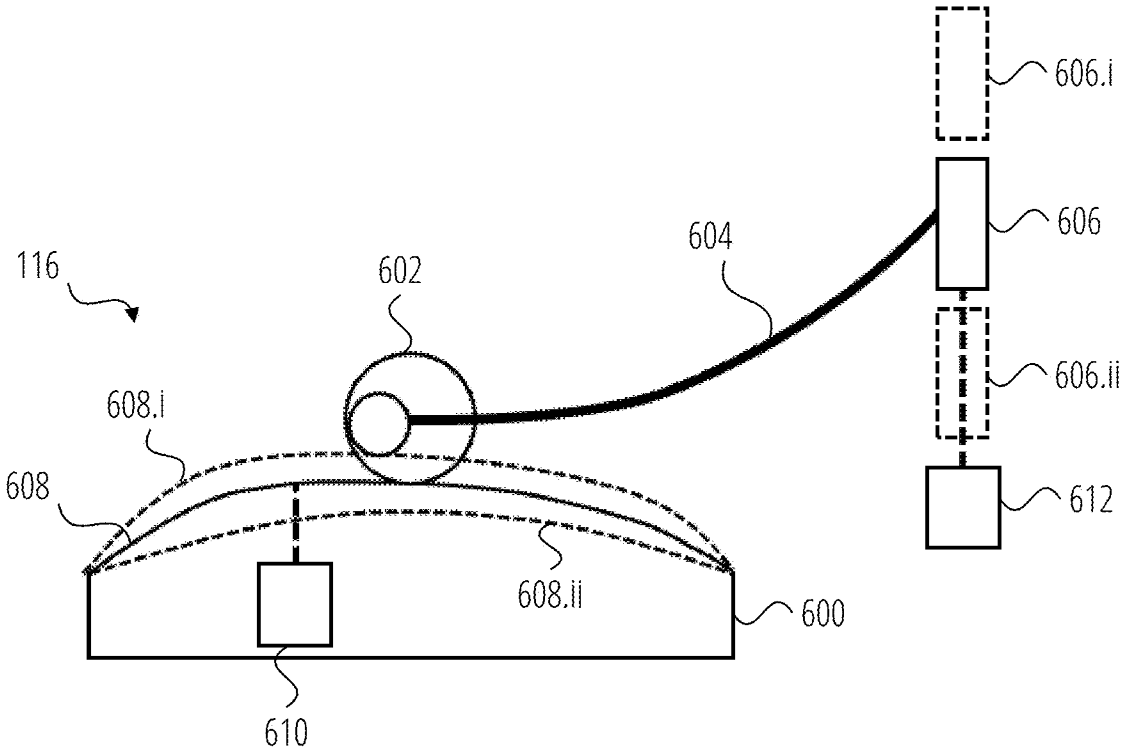
FIG. 6 is a front view of a dynamic offload system.

FIG. 6 is a front view of a counterbalance 116 that includes a dynamic offload system. The counterbalance 116 can be used to apply a counterbalance force to a display of an HMD or another object. The counterbalance force applied by the counterbalance 116 can be used to counter, offset, or offload intrinsic forces that are applied to the object (e.g., intrinsic forces that resist movement or encourage undesired movement of the object). This can minimize forces used to actuate an adjustment mechanism in order to move or reposition the object.

The counterbalance 116 can include a cam 600, a roller 602, and an energy storage device 604. Each of the components of the counterbalance 116 can be the same as or similar to components of the counterbalances 116 described above in reference to FIGS. 2A-2C and FIG. 4. The cam 600 can be coupled to an object, such as a display 112 of an HMD 100 and the counterbalance 116 can apply a force to the object through the cam 600. The energy storage device 604 can be coupled to the cam 600 through the energy storage device 604 and can apply a force to the cam 600 through the roller 602. One end of the energy storage device 604 can be fixed or stationary through attachment to an anchor 606.

In the example of FIG. 6, the counterbalance force applied through the counterbalance 116 can be dynamic. FIG. 6 illustrates two methods of providing a dynamic counterbalance 116; however, other methods of providing a dynamic counterbalance 116 are also contemplated. In some examples, a surface profile of a cam surface 608 of the cam 600 along which the roller 602 rolls can be adjustable. For example, the solid line of the cam surface 608 can illustrate an initial position of the cam surface 608, the upper dashed line of the cam surface 608 can illustrate an extended position 608.*i* of the cam surface 608, and the lower dashed line of the cam surface 608 can illustrate a retracted position 608.*ii* of the cam surface 608. An actuator 610 can be provided to adjust the surface profile of the cam surface 608 between the extended position 608.*i*, the initial position, and the retracted position 608.*ii*. The surface profile of the cam surface 608 can be adjusted by moving or repositioning a flexible surface of the cam surface 608, adjusting a path that the roller 602 moves along relative to the cam surface 608, or the like. In an example in which the cam surface 608 includes a flexible surface, the actuator 610 can push a portion of the cam surface 608 vertically upwards or pull the portion of the cam surface 608 vertically downwards to move the cam surface 608 from the initial position to the extended position 608.*i* or the retracted position 608.*ii*, respectively. In an example in which the path that the roller 602 moves along relative to the cam surface 608 is adjustable, the actuator 610 can move the roller 602 between different tracks, channels, or the like along the cam surface 608 in order to change the effective surface profile of the cam surface 608 from the initial position to the extended position 608.*i* or the retracted position 608.*ii*. The effective surface profile of the cam surface 608 can be moved between any number of different profiles or can be changed in any way depending on expected changes to intrinsic forces applied to an object that may be experienced.

In some examples, a position of the anchor 606 relative to the cam 600 can be adjustable. For example, the solid rectangle of the anchor 606 can illustrate an initial position of the anchor 606, the upper dashed line of the anchor 606 can illustrate a raised position 606.*i* of the anchor 606, and the lower dashed line of the anchor 606 can illustrate a lowered position 606.*ii* of the anchor 606. An actuator 612 can be provided to adjust the position of the anchor 606 relative to the cam 600 between the initial position, the raised position 606.*i*, and the lowered position 606.*ii*. Moving the position of the anchor 606 relative to the cam 600 can be used to adjust a direction of force applied to the cam 600 through the roller 602, adjust characteristics of the energy storage device 604 (e.g., a stiffness of a spring, a magnitude of force applied through the energy storage device 604, a linearity of the force applied through the energy storage device 604, or the like), or the like. Although the position of the anchor 606 is illustrated as being adjustable in a vertical direction, the position of the anchor 606 can be adjusted in any desired direction.

Adjusting the cam surface 608 between different surface profiles and adjusting the position of the anchor 606 relative to the cam 600 can be used to adjust the counterbalance force provided by the counterbalance 116. This can be used to counterbalance intrinsic forces applied to an object, even as those intrinsic forces change. Intrinsic forces on an object can change depending on characteristics of an environment around the object, characteristics of the object, and the like. For example, in an HMD 100, a force applied by a cover 118 to a display 112 can decrease over time as the cover degrades. Increasing temperatures can increase or decrease the force applied by the cover 118 to the display 112. A dynamic counterbalance 116 can be provided to counterbalance these intrinsic forces, even as the intrinsic forces change.

Figure 7:
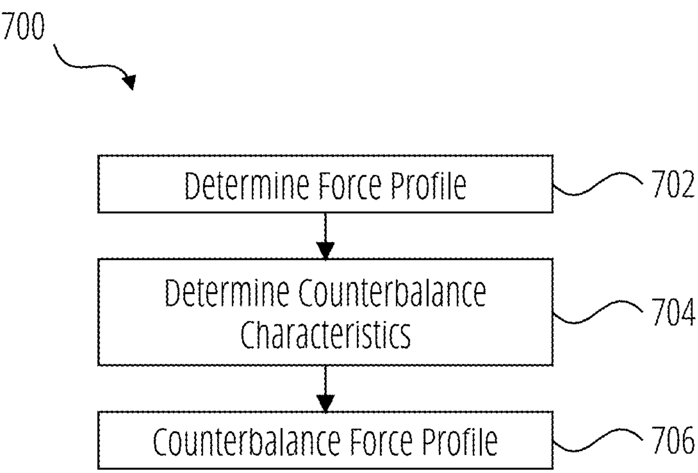
FIG. 7 is a flow chart of a method of providing a counterbalance force.

FIG. 7 illustrates a flow chart of a method 700 of providing a counterbalance force. The method 700 can be used to counterbalance forces (e.g., intrinsic forces) applied to a display, such as a display 112 of an HMD 100, or to counterbalance forces applied to any other object. The method 700 can include a block 702 in which a force profile is determined, a block 704 in which characteristics of a counterbalance are determined, and a block 706 in which the force profile is counterbalanced.

In block 702, a force profile is determined. The force profile can be a profile of intrinsic forces acting on an object. The force profile can be limited to intrinsic forces acting on the object that impact movement of the object by an adjustment mechanism (e.g., the adjustment mechanism 114, discussed above). The line 302, discussed above, is an example of a force profile that can be determined for forces acting on a display 112. In the example illustrated in FIG. 3, the line 302 indicates that intrinsic forces acting on the object vary non-linearly.

The force profile can be determined by various means. For example, the force profile can be determined by modeling forces that act on an object. The force profile can be determined by taking direct measurements on the object, such as while the object moves between various positions along a travel of the object. A motor can be used to move the object between two end points of a travel of the object, the motor can detect resistance of the object to movement, and this can be used to generate the force profile.

In block 704, characteristics of a counterbalance are determined. The counterbalance can be any of the counterbalances 116 discussed above. The characteristics can include a surface profile of a cam surface for a cam, a type of energy storage device, characteristics of the energy storage device, characteristics of a roller that is coupled between the energy storage device and the cam, and the like. The force profile from block 702 and certain characteristics of the counterbalance can be provided, and remaining characteristics of the counterbalance can then be determined. The characteristics of the counterbalance can be determined through finite element analysis or the like. As an example, characteristics that can be provided include the force profile from block 702; a leaf spring as a type of energy source; a stiffness, preload, and max deflection for the leaf spring; and a diameter of the roller. Based on these characteristics, a surface profile for a cam surface of a cam can be output. Characteristics of the cam, the energy storage device, and the roller can be determined to mirror the force profile of block 702. The force applied to the object by the counterbalance can vary linearly or non-linearly with a position of the object to mirror the force profile of block 702. The determining of block 704 can be represented by the force profile of line 304, discussed above. The characteristics of the counterbalance can be determined to minimize a difference between the intrinsic forces applied to an object (e.g., the force profile of block 702) and the counterbalance forces applied to the object as the object moves throughout its travel.

In block 706, the force profile is counterbalanced. Once the force profile and counterbalance characteristics are determined, a counterbalance can be applied to the object in order to counterbalance or offload the intrinsic forces applied to the object. By determining the counterbalance characteristics based on the force profile of block 702, the counterbalance forces can mirror and offset the intrinsic forces applied to the object. This reduces or minimizes the amount of force that can be applied to the object to move the object. Further, the counterbalance can apply a non-linear force to the object that is determined based on intrinsic forces applied to the object throughout the travel of the object. Thus, the force used to move the object is minimized throughout the travel of the object. This allows for the object to be moved by decreased amounts of force. Thus, the object can be moved by smaller, cheaper components, user effort is decreased, forces experienced by the object are minimized, and user experiences are improved.

As described above, intrinsic forces that act on an object can change based on characteristics of the object and the object's surroundings. For example, in the case of a cover coupled to a display of an HMD, forces exerted by the cover on the display can decrease over time as the cover becomes degraded and can increase or decrease as a temperature of the environment of the HMD changes. In some examples, the force profile of block 702 can be determined dynamically and characteristics of the counterbalance at block 704 can be determined and changed dynamically. This can result in the force applied to an object in block 706 changing dynamically.

As an example, a motor that moves an object can dynamically determine a force profile at block 702 for an object by constantly determining the force used to move the object. As another example, an age of the object or a temperature of the object can be dynamically tracked through a clock or thermometer, respectively, and this data can be used to estimate the force profile at block 702. Based on this updated force profile, altered characteristics of the counterbalance can be determined at block 704. This can include altering a position of an anchor of the energy storage device, altering a surface profile (e.g., an effective surface profile) of a cam surface of the cam, or the like. Thus, in block 706, the intrinsic forces applied to the object are dynamically counterbalanced by the forces applied through the counterbalance.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A head-mountable device (HMD), comprising:

a housing;

a display coupled to the housing;

a counterbalance coupled to the display, the counterbalance comprises a cam; and an energy storage device coupled to the display, the energy storage device configured to apply a force to the display;

a profile of the force being configured to vary non-linearly as a position of the display relative to the housing changes; and a position of a component of the counterbalance configured to adjust based on a change to the profile of the force.

2. The HMD of claim 1, wherein:

the energy storage device is configured to apply the force to the display through the cam; and the profile of the force is configured to vary according to a surface profile of the cam.

3. The HMD of claim 2, wherein the surface profile comprises a plurality of dimples.

4. The HMD of claim 2, wherein the energy storage device comprises a mechanical spring.

5. The HMD of claim 2, wherein the energy storage device is coupled to the surface profile of the cam by a bearing or bushing configured to roll along the surface profile.

6. The HMD of claim 1, wherein the energy storage device comprises a non-linear energy storage device.

7. The HMD of claim 1, further comprising a cover coupled to the display, wherein:

the cover is configured to apply a cover force to the display; and the profile of the force is configured to counterbalance the cover force applied to the display by the cover.

8. An electronic device comprising:

a display;

an adjustment mechanism configured to move the display; and a cam mounted to the display and configured to apply an offload force to the display, the cam comprising an adjustable surface, wherein:

the offload force is configured to vary based on a surface profile of the cam; and the offload force is configured to minimize a force applied by the adjustment mechanism to move the display.

9. The electronic device of claim 8, wherein the offload force is further configured to vary non-linearly as the display moves through a range of motion.

10. The electronic device of claim 8, wherein the offload force is configured to vary dynamically as characteristics of the electronic device change.

11. The electronic device of claim 8, further comprising a manual actuator configured to actuate the adjustment mechanism.

12. The electronic device of claim 8, further comprising a motor configured to actuate the adjustment mechanism.

13. The electronic device of claim 8, wherein the offload force is applied to the display through the cam by a passive energy storage device.

14. The electronic device of claim 8, wherein the offload force applied to the display is configured to vary from a first direction to a second direction opposite the first direction as the display moves in a single direction through a range of motion.

15. A method of counterbalancing a force, the method comprising:

determining a profile of a force acting on a display;

determining a surface profile for a cam based on the profile of the force, the cam is mounted to the display;

applying an offload force to the display through a counterbalance that comprises the cam, wherein the offload force varies non-linearly based on the surface profile; and adjusting a position of a component of the counterbalance based on a change to the profile of the force acting on the display.

16. The method of claim 15, wherein the change is detected based on environmental conditions of the display or an age of the display.

17. The method of claim 15, wherein adjusting the position of the component comprises changing the surface profile of the cam.

18. The method of claim 15, wherein the surface profile is determined to minimize a difference between the force and the offload force throughout a travel of the display.

19. The method of claim 15, wherein the profile of the force is determined by measuring the force as the display moves through a range of motion.

* * * * *